(12) United States Patent
Wiggins, Sr.

(10) Patent No.: US 8,382,859 B2
(45) Date of Patent: Feb. 26, 2013

(54) PROCESS FOR COMPACTING POWDERS

(75) Inventor: William H. Wiggins, Sr., Sandersville, GA (US)

(73) Assignee: Thiele Kaolin Company, Sandersville, GA (US)

( * ) Notice: Subject to any disclaimer, the term of this patent is extended or adjusted under 35 U.S.C. 154(b) by 963 days.

(21) Appl. No.: 12/150,617

(22) Filed: Apr. 30, 2008

(65) Prior Publication Data
US 2009/0271953 A1 Nov. 5, 2009

(51) Int. Cl.
*C05B 19/00* (2006.01)

(52) U.S. Cl. .................. 23/313 R; 23/313 AS

(58) Field of Classification Search ............... 23/313 R, 23/313 AS
See application file for complete search history.

(56) References Cited

U.S. PATENT DOCUMENTS

| | | | |
|---|---|---|---|
| 2,806,771 A * | 9/1957 | Cuthbertson et al. | 23/313 R |
| 3,586,523 A | 6/1971 | Fanselow et al. | |
| 4,561,597 A | 12/1985 | Cook et al. | |
| 4,593,860 A | 6/1986 | Cook et al. | |
| 4,977,116 A * | 12/1990 | Rumpf et al. | 501/128 |
| 5,074,475 A | 12/1991 | Suitch et al. | |
| 5,129,953 A | 7/1992 | Suitch et al. | |
| 5,328,506 A | 7/1994 | Crumbley et al. | |
| 5,364,579 A | 11/1994 | Dunaway et al. | |
| 6,238,473 B1 | 5/2001 | Maxwell et al. | |
| 6,761,763 B2 | 7/2004 | Wiggins, Sr. et al. | |
| 7,964,529 B2 * | 6/2011 | Borgese et al. | 502/400 |
| 2005/0084560 A1 | 4/2005 | Roland | |

FOREIGN PATENT DOCUMENTS

WO   WO 97/42268   11/1997

* cited by examiner

*Primary Examiner* — Edward Johnson
(74) *Attorney, Agent, or Firm* — Baker, Donelson, Bearman, Caldwell & Berkowitz, PC

(57) ABSTRACT

Fluffy powders, such as calcined kaolin clays or air floated clays, can be compacted using a process which comprises applying increasing amounts of pressure to a powder moving through a confinement area. The compacted product has an improved bulk density and improved wet out and slurry incorporation times as compared to the non-compacted starting material feed.

12 Claims, 3 Drawing Sheets

PROCESS FOR COMPACTING POWDERS

TECHNICAL FIELD

The present invention relates to a process for compacting powders. In a more specific aspect, the present invention relates to a process for increasing the bulk density of powders.

For ease of reference, this invention will be described with reference to calcined kaolin clay as a powder. However, this invention will be understood as applicable to other powders, such as silica powders, air floated clays, etc.

For purposes of this invention, the term "bulk density" will be understood to mean the mass per unit volume of a material, and is generally stated in grams per cubic centimeter or pounds per cubic foot. The bulk density will vary according to the specific material. For example, an uncompacted calcined kaolin clay may have a bulk density of from about 10 to about 15 pounds per cubic foot, while an uncompacted air floated kaolin clay may have a bulk density of from about 20 to about 30 pounds per cubic foot.

Additionally, for proposes of this invention, the term "powder" will be understood to mean a fluffy material which is comprised of fine, loose particles.

In the process of this invention, a powder will be compacted to a bulk density which is increased (i.e., higher) as compared to the bulk density of the uncompacted starting powder.

BACKGROUND OF THE INVENTION

Low bulk density, fluffy powders generally are difficult to compact in traditional equipment, without additives, due to difficulties in feeding the powder into the compaction zone of the equipment.

Kaolin is a naturally occurring, relatively fine, white clay mineral which may be generally described as a hydrated aluminum silicate. After purification and beneficiation, kaolin is widely used as a filler and pigment in various materials, such as rubber and resins, and in various coatings, such as paints and coatings for paper.

The use of kaolin clay in paper coatings serves, for example, to improve brightness, color, gloss, smoothness, opacity, printability and uniformity of appearance of the coated paper. As a filler in paper formulations, kaolin clay is used to extend fiber and reduce cost and to improve opacity, brightness and other desirable characteristics of the paper product.

Calcined kaolin clay is a particular type of kaolin and is often used in large quantities for paper manufacture. Calcined kaolin can be obtained by heating beneficiated kaolin clay at temperatures of at least 550° C. The calcination step dehydroxylates and converts the kaolin to a noncrystalline aluminosilicate phase. The term "dehydroxylates" refers to the removal of structural hydroxide groups from the kaolin as water vapor. Calcined kaolin has improved light scattering characteristics (as compared to the non-calcined kaolin) and, therefore, contributes a high degree of opacity to the coated paper.

Fanselow et al. U.S. Pat. No. 3,586,523 relates to calcined kaolin clay.

Calcined kaolin clay pigments (such as the product marketed under the trademark KAOCAL by Thiele Kaolin Company of Sandersville, Ga.) are widely used in the paper industry. Commonly, calcined kaolin clay is blended with hydrous kaolin clay in the paper mills prior to the manufacture of a finished paper product. These blends are typically comprised of about 10 to about 30 parts by weight calcined kaolin and about 70 to about 90 parts by weight hydrous kaolin.

During processing, the calcined clay is often pulverized in a high energy impact mill and then air-classified to remove abrasive particles larger than 325 mesh, as these particles tend to cause scratching problems during coating of a paper. The resulting pulverized calcined clay product is fluffy and has a low bulk density when compared to a spray dried hydrous kaolin clay. For example, the bulk density of calcined kaolin is often about 10 to about 15 pounds per cubic foot, whereas the bulk density of spray dried hydrous kaolin is often about 40 to about 55 pounds per cubic foot.

The fluffy, low bulk density calcined clay product can be difficult to handle with conventional bulk handling systems. Therefore, the product is typically shipped dry in bags, rail freight cars or as an optimally dispersed slurry, typically at about 50% solids. In addition, because of low bulk density, dry calcined clay will commonly require either larger bags or larger volume rail freight cars when compared to a spray dried hydrous clay, which results in higher shipping costs for a dry calcined clay.

In the industry, efforts have been made to improve the bulk density, dusting and powder flow characteristics of calcined clay. Examples of such efforts are shown in Suitch et al. U.S. Pat. Nos. 5,074,475 and 5,129,953; Cook et al. U.S. Pat. Nos. 4,561,597 and 4,593,860; Dunaway et al. U.S. Pat. No. 5,364,579; Crumbley et al. U.S. Pat. No. 5,328,506; and Munsterman et al. International Patent Publication No. WO 97/42268.

A process for the manufacture of high bulk density agglomerates from a mixture of calcined kaolin clay, hydrous kaolin clay and water is disclosed in Maxwell & Malla U.S. Pat. No. 6,238,473.

Wiggins, Sr., Crabb & Wiggins, Jr. U.S. Pat. No. 6,761,763 describes a process for compacting calcined kaolin after packaging.

Consequently, there is a need in the industry for a process by which powders (such as calcined kaolin clay, silica powders and air floated clays) can be compacted to provide a product which has an increased bulk density and which can be loaded directly into conventional bulk rail freight cars, bulk highway trucks or bags without the addition of water or other additives.

SUMMARY OF THE INVENTION

Briefly described, the present invention provides a process for compacting powders, such as calcined kaolin clay, to provide a product having an increased bulk density. The compacted product of this invention allows for increased weight loading of conventional shipping containers without the addition of water or other additives. The properties and performance of the compacted product of this invention are either equivalent to or improved over the corresponding properties and performance of the non-compacted powder.

Accordingly, an object of this invention is to provide a process for compacting powders without negatively affecting the performance and properties of the compacted product.

Another object of this invention is to provide a process for compacting powders, such as calcined kaolin clay and air floated clays.

Another object of this invention is to provide a process for compacting powders, in which the compacted product has an improved wet out time.

Another object of this invention is to provide a process for compacting powders, in which the compacted product has an improved slurry incorporation time.

Another object of this invention is to provide a process for compacting powders, in which the compacted product can be loaded into conventional shipping equipment directly with improved weight loading or packaged in smaller packages for improved weight loading in trucks, containers or rail freight cars.

Still another object of this invention is to provide a process for compacting powders, in which the compacted product retains good rheological properties.

Still another object of this invention is to provide a process for compacting powders, in which the compacted product retains good optical properties.

These and other objects, features and advantages of this invention will become apparent from the following detailed description.

DETAILED DESCRIPTION OF THE INVENTION

In accordance with the present invention, a powder (such as calcined kaolin clay or an air floated clay) is compacted to a bulk density which is increased from the initial bulk density of the uncompacted starting powder. For example, an uncompacted starting calcined kaolin clay having an initial bulk density of about 10 to about 15 pounds per cubic foot can be compacted by the process of this invention to a compacted calcined kaolin clay having a bulk density of about 20 to about 40 pounds per cubic foot, preferably at least about 25 pounds per cubic foot. Additionally, an uncompacted starting air floated clay can be compacted by the process of this invention to a compacted air floated clay having a bulk density of about 20 to about 60 pounds per cubic foot, preferably at least about 25 pounds per cubic foot. The compacted product has advantages over the non-compacted powder starting material, including an improved wet out time and an improved slurry incorporation time.

In this application, the term "increased" will be understood to mean that the bulk density of the compacted product will be substantially higher than the bulk density of the original non-compacted starting material.

Other properties (such as optical and Theological properties) of the compacted product of this invention are either improved or equivalent to the corresponding properties of the non-compacted starting material.

The compacted powder product of this invention is produced by a process in which increasing pressures are gradually applied directly to the non-compacted powder to compact the powder to an increased bulk density. In this invention, these pressures can be as low as about 0 pounds per square inch at the start of the process and, depending upon the starting powder and the desired final product, can increase to about 450 pounds per square inch (or higher if necessary to obtain the desired final product).

Figure 1:
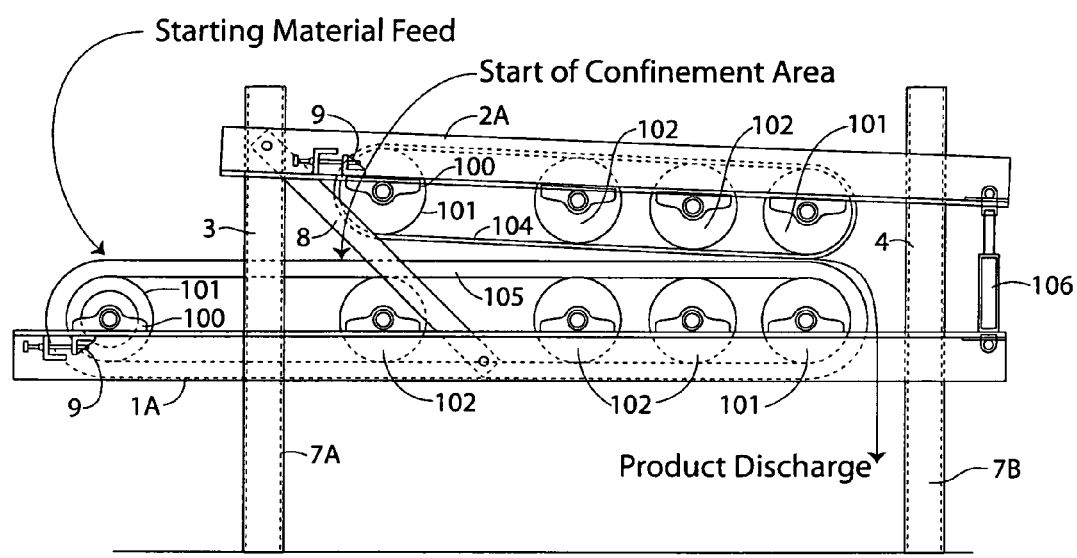
FIG. 1 is a side view of an apparatus which can be used in the compacting process of this invention.

Referring now to the drawings, in which like numbers represent like elements, FIG. 1 shows an apparatus comprised of two belt conveyors 104 and 105 which converge toward the product discharge end of the apparatus. The non-compacted calcined kaolin clay starting material is conveyed through the apparatus and gradually subjected to increasing pressures before being discharged from the apparatus as a compacted product having an increased bulk density.

Figure 2:
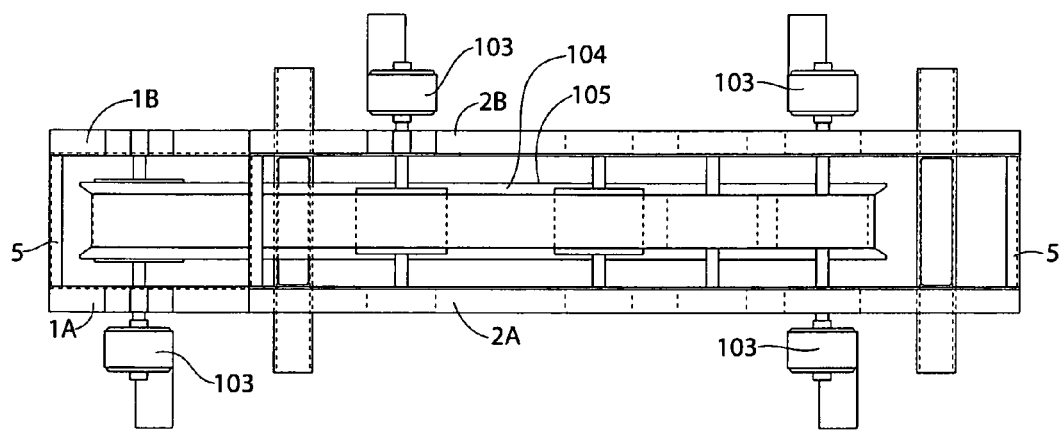
FIG. 2 is a top view of the apparatus shown in FIG. 1.
Figure 3:
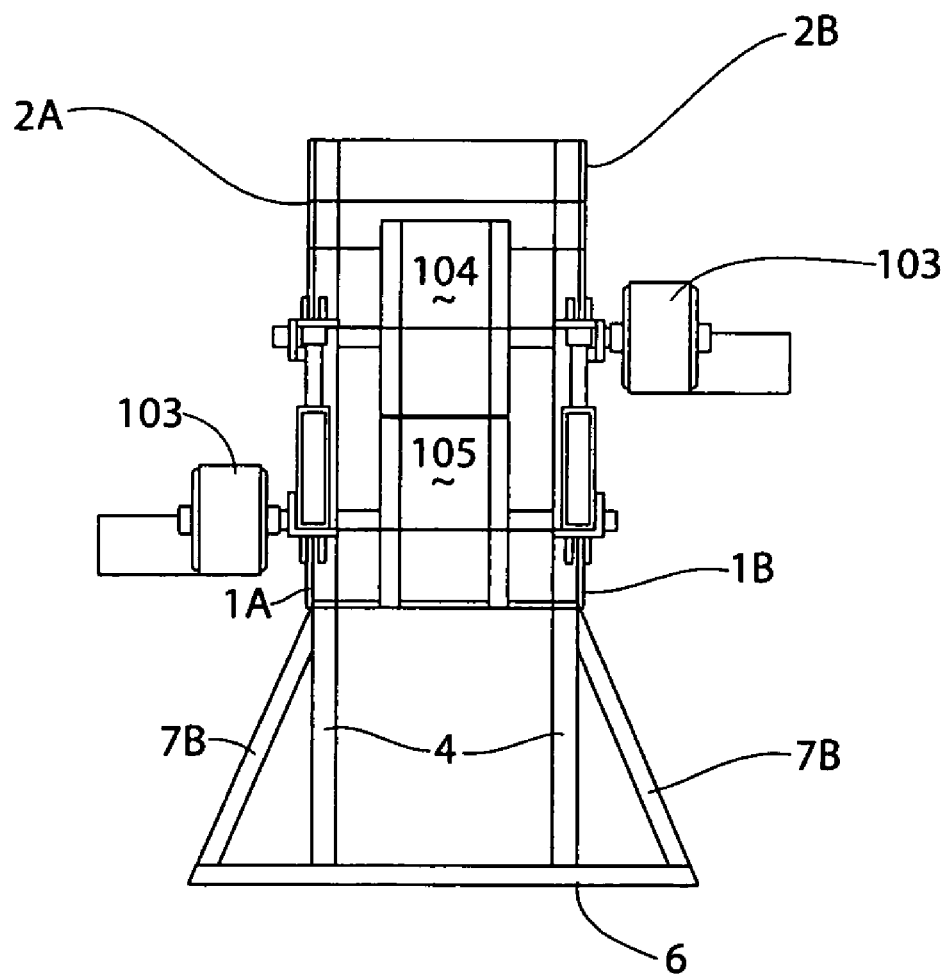
FIG. 3 is an end view of the apparatus shown in FIG. 1.

FIG. 1 is a side view of a preferred embodiment of an apparatus which can be used in the compacting process of this invention. This apparatus shows the convergence of belts 104 and 105, drive rolls 101 and idler rolls 102 that support the belts, apply the various pressures and drive the belts. In this embodiment, the apparatus comprises certain structural members—steel angles 1A, 1B, 2A & 2B; steel channels 3, 4, 5, 6, 7A & 7B; and steel bar 8. Tension in the belts 104 and 105 is adjustable through bracket 9. Pillow block bearing 100 supports the drive rolls 101 and idler rolls 102. Gear reduction in the apparatus of this invention can be accomplished through a shaft mounted gear reducer 103 (as shown in FIGS. 2 & 3). Pressure on drive rolls 101 and idler rolls 102 is maintained and adjusted by hydraulic cylinder 106. The locations for the introduction of starting feed material, start of the confinement area and product discharge are shown in FIG. 1.

With reference to FIG. 1, a non-compacted starting material feed (a powder) is fed into the apparatus, conveyed through a confinement area and discharged as shown in FIG. 1. The bottom belt 105 has sides to prevent the material from escaping as increasing pressures are applied. The top belt 104 fits snuggly between the sides and applies pressure as the material is conveyed through the apparatus. Hydraulic cylinder 106 maintains a constant pressure on the product discharge end of the apparatus.

FIGS. 2 & 3 show shaft mounted gear reducers 103 that power the drive rolls 101, move the belts 104 and 105 and convey the powder through the confinement area. Gear reducers 103 are used on both ends of the belts for the apparatus as shown in this embodiment.

Instead of top belt 104, other means can be used to apply the desired pressure(s) to the moving powder in the confinement area.

Results of tests for the compaction of calcined kaolin clay show a substantial increase in bulk density from about 12 pounds per cubic foot for the non-compacted material to about 25 pounds per cubic foot for the compacted product. Higher bulk densities are possible with additional pressure.

Conventional rail and highway equipment for shipping non compacted powder materials can be used for the compacted product of this invention. The compacted product of this invention allows increased weight when loaded in conventional equipment (i.e., more tons of product per rail freight car or highway truck).

The compacted product of this invention can be packaged in smaller bags which can be filled faster, which speeds up the packaging operation and allows increased weight per container for shipping.

Additionally, certain properties of the compacted calcined kaolin clay are either improved or at least equivalent to the corresponding properties of the non-compacted calcined clay starting material feed. A comparison of these properties is shown in Table I. For the compacted product shown in Table 1, the process of this invention used pressures starting at about 0 pounds per square inch and gradually increasing to about 350 pounds per square inch. Non-compacted Kaocal calcined kaolin clay is used as the starting material feed in Table 1.

TABLE 1

Characterization of KAOCAL Samples (Feed and Compacted Product)

| | Feed | \multicolumn{7}{c}{Compacted Product} |
|---|---|---|---|---|---|---|---|---|
| | | \multicolumn{7}{c}{Sampling Time} |
| | — | 10 AM | 11 AM | 12 Noon | 1 PM | 2 PM | 3 PM | 4 PM |
| | \multicolumn{8}{c}{Sample ID} |
| | 549-61-1 | 549-61-2 | 549-61-4 | 549-61-6 | 549-61-8 | 549-61-10 | 549-61-12 | 549-61-14 |
| Bulk Density lb/ft$^3$ | 11.7 | 25.0 | 25.8 | 25.6 | 25.7 | 25.8 | 25.3 | 25.4 |
| Surface Area m$^2$/g | 16.1 | 16.8 | 16.7 | 16.7 | 16.7 | 16.6 | 16.6 | 16.6 |
| Wet out Time | 1 min. 45 sec. | 42 sec. | 36 sec. | 37 sec. | 26 sec. | 39 sec. | 29 sec. | 31 sec. |
| GE Brightness | 93.0 | 92.9 | 92.9 | 93.0 | 92.9 | 92.9 | 92.9 | 93.0 |
| Slurry GE Brightness | 93.0 | 93.0 | 92.9 | 93.0 | 92.9 | 92.8 | 92.9 | 93.0 |
| 325 Mesh Residue % | 0.0022 | 0.0030 | 0.0017 | 0.0020 | 0.0018 | 0.0021 | 0.0038 | 0.0039 |
| Sedigraph | | | | | | | | |
| % <10 μm | 98.9 | 98.9 | 98.4 | 98.3 | 98.6 | 98.2 | 98.8 | 98.1 |
| % <5 μm | 94.2 | 93.6 | 93.7 | 94.1 | 94.1 | 94.5 | 93.7 | 93.7 |
| % <2 μm | 85.0 | 85.0 | 85.0 | 84.9 | 84.4 | 85.4 | 84.5 | 84.8 |
| % <1 μm | 69.0 | 73.3 | 74.1 | 74.5 | 73.9 | 74.8 | 73.2 | 74.0 |
| % <0.5 μm | 18.3 | 34.3 | 36.2 | 35.8 | 35.6 | 37.2 | 34.8 | 36.2 |
| % <0.2 μm | −3.4 | 3.5 | 3.2 | 1.4 | 2.7 | 1.8 | 2.7 | 2.2 |
| Slurry Incorporation Time | 7 min. 30 sec. | 1 min. | 1 min. | 1 min. | 1 min. | 1 min. | 1 min. | 1 min. |
| Solids % | 52.0 | 51.9 | 51.8 | 51.9 | 51.9 | 52.0 | 52.0 | 51.9 |
| pH | 6.6 | 6.6 | 6.7 | 6.6 | 6.6 | 6.6 | 6.6 | 6.7 |
| Brookfield cP #1 Spindle @ 20 rpm | 254 | 243 | 244 | 248 | 232 | 261 | 250 | 244 |
| Hercules | | | | | | | | |
| Dynes @ 1100 rpm | — | 2.6 | 2.5 | 2.9 | 4.6 | 3.6 | 2.9 | 6.8 |
| rpm @ 18 Dynes | 974 | 1431 | 1508 | 1374 | 1198 | 1288 | 1368 | 1134 |
| Kubelka-Munk Coating Constants | | | | | | | | |
| 457 nm | | | | | | | | |
| R ∞ | 90.3 | 90.5 | 90.0 | 89.6 | 90.2 | 90.3 | 89.9 | 90.6 |
| S | 1.09 | 1.02 | 1.067 | 1.051 | 1.071 | 1.083 | 1.064 | 1.057 |
| K | 0.0057 | 0.0051 | 0.0060 | 0.0063 | 0.0057 | 0.0056 | 0.0060 | 0.0052 |
| 550 nm | | | | | | | | |
| R ∞ | 92.8 | 92.9 | 92.9 | 91.6 | 92.9 | 92.6 | 92.6 | 93.0 |
| S | 0.879 | 0.847 | 0.841 | 0.929 | 0.854 | 0.910 | 0.859 | 0.879 |
| K | 0.0024 | 0.0023 | 0.0023 | 0.0036 | 0.0023 | 0.0027 | 0.0025 | 0.0023 |

In Table I, the data shown are typical for a non-compacted Kaocal calcined kaolin clay. Other individual values were measured for the non-compacted and compacted Kaocal calcined kaolin clay.

With reference to Table 1, and for purposes of this application, the following terms will be understood as follows:

Slurry Incorporation Time—refers to the ease of a calcined kaolin clay slurry make down. A laboratory Premier mixer is used to slurry 400 grams of a calcined kaolin clay sample to 50% solids. During the make down process, the sample is added gradually while keeping the Premier mixer running at 2500-3000 rpm. The total time to add all of the calcined kaolin clay sample into the slurry is referred to as the slurry incorporation time.

GE Brightness—Dry versus Slurry Brightness: GE Brightness is tested following TAPPI Test Method No. T6460 0m-02. A brief description of the procedure is given below.

For the dry brightness, twelve grams of each sample are pulverized using an Anglo pulverizer for 25 seconds. The brightness of the pulverized sample is measured. For the slurry brightness, each slurry sample is flocculated using alum, filtered and oven dried at 70° C. overnight. The sample is crushed and pulverized using an Anglo pulverizer (12 grams, 25 seconds), and the brightness of the pulverized sample is measured.

Bulk Density—refers to the mass per unit volume, generally stated in grams per cubic centimeter or pounds per cubic foot. As shown in Table 1, the compacted calcined kaolin clay product has a bulk density of at least about 25 lbs./cu. ft.

To determine bulk density, the volume of the container is determined using length, width and height dimensions; the weight of the compacted clay is determined; and these values are then converted to pounds per cubic foot.

Wet Out Time—refers to the ease with which a calcined kaolin clay can be immersed in water. A wet out test consists of processing 100 grams of tap water into a 600 ml. beaker, after which 50 grams of calcined kaolin clay are poured into the beaker while simultaneously starting a stopwatch. At the point when all of the clay has disappeared under the surface of the water, without any agitation, the time is noted and expressed in terms of seconds.

325 Mesh Screen Residue—refers to the amount of material which is retained on a 325 mesh screen when screened in slurry form; refer to TAPPI Method No. 681. In this invention, the residue is less than about 0.01 percent (i.e., a low 325 mesh screen residue).

Optical Properties—also referred to as opacity or light scattering ability; determined by the scattering coefficient, which is measured by the method described in TAPPI, 1978, Vol. 61, No. 6, pages 78-80.

Brookfield and Hercules Viscosities—determined by TAPPI Method No. T-648-OM-97, as revised in 1997. This method sets forth specific procedures for determination of Brookfield (low shear) and Hercules (high shear) viscosities.

The term "good optical properties" means that the compacted products of this invention can be effectively used in those applications when opacity is a desired feature, such as in paper coatings. The term "good rheological characteristics" means that the compacted products of this invention (a) have a viscosity (i.e., flow characteristics) which enables such products to be used in coatings which can be worked, pumped and/or coated by means which are conventional in the paper industry and (b) have a viscosity which is at least equivalent to the viscosity of the starting non-compacted starting material feed.

In this invention, the residence time of the product in the confinement area (where the various pressures are applied to the moving material) is dependent upon several factors, including the non-compacted starting material being treated, the length and width of the confinement area, the production rate of the compacted product and the desired final bulk density of the compacted product. Thus, the residence time may vary from product to product. The width of the apparatus, speed of the belts, number of rolls, pressure on the rolls and the material being compacted are factors in determining the production capacity of the apparatus.

Preferably, this invention is utilized in a continuous process, but a batch process can also be utilized.

In a preferred embodiment of this invention, the confinement area is elongated, and the width of the elongated confinement area can be changed to meet the objectives of a particular process.

This invention has been described in detail with particular reference to certain embodiments, but variations and modifications can be made without departing from the spirit and scope of the invention as defined in the following claims.

What is claimed is:

1. A process for compacting a powder, wherein the process comprises the steps of:
   A. placing a non-compacted powder in an elongated confinement area having top and bottom belt conveyors which converge toward a product discharge end;
   B. moving the powder between the top and bottom belt conveyors in the elongated confinement area;
   C. compacting the powder by applying increasing pressure to the moving powder as the powder moves between the top and bottom belt conveyors in the elongated confinement area; and
   D. discharging a compacted product having a bulk density which is increased over the bulk density of the non-compacted powder.

2. A process as defined by claim 1 wherein the powder is calcined kaolin clay.

3. A process as defined by claim 1 wherein the powder is an air floated clay.

4. A process as defined by claim 1 wherein the pressure increases to about 450 pounds per square inch.

5. A process as defined by claim 1 wherein the compacted product has a bulk density of at least about 25 pounds per cubic foot.

6. A process as defined by claim 1 wherein the compacted product has a bulk density of at least about 30 pounds per cubic foot.

7. A process as defined by claim 1 wherein the compacted product has a bulk density from about 20 to about 60 pounds per cubic foot.

8. A process as defined by claim 1 wherein the compacted product has an improved wet out time.

9. A process as defined by claim 1 wherein the compacted product has an improved slurry incorporation time.

10. A process as defined by claim 1 wherein the compacted product has a low 325 screen mesh residue.

11. A process as defined by claim 1 wherein the compacted product has good optical properties.

12. A process as defined by claim 1 wherein the compacted product has good rheological properties.

* * * * *